(12) United States Patent
Lepage et al.

(10) Patent No.: US 7,017,842 B2
(45) Date of Patent: Mar. 28, 2006

(54) BALE MANIPULATOR DRIVE SYSTEM FOR A BALE PROCESSOR

(75) Inventors: Charles Lepage, Saskatoon (CA); Murray Kosokowsky, Pilger (CA); Kimball Lischynski, Saskatoon (CA)

(73) Assignee: Highline Mfg. Inc., Vonda (CA)

( * ) Notice: Subject to any disclaimer, the term of this patent is extended or adjusted under 35 U.S.C. 154(b) by 132 days.

(21) Appl. No.: 10/386,608

(22) Filed: Mar. 12, 2003

(65) Prior Publication Data

US 2004/0251349 A1 Dec. 16, 2004

(51) Int. Cl.
*B02C 13/28* (2006.01)

(52) U.S. Cl. .................... 241/101.2; 241/101.762; 241/186.4; 241/605

(58) Field of Classification Search ............ 241/101.2, 241/101.762, 186.4, 605
See application file for complete search history.

(56) References Cited

U.S. PATENT DOCUMENTS

| | | | |
|---|---|---|---|
| 3,436,028 A | 4/1969 | Koehnen et al. ............ 241/186 |
| 3,874,609 A | 4/1975 | Larson | |
| 3,958,772 A | 5/1976 | Hynson | |
| 4,597,703 A | 7/1986 | Bartolini .................... 414/24.6 |
| 4,779,810 A | 10/1988 | Frey ........................... 241/101 |
| 4,830,292 A | 5/1989 | Frey ........................... 241/101 |
| 4,951,883 A | 8/1990 | Loppoli et al. ............. 241/101 |
| 5,071,079 A | 12/1991 | Fykse et al. ................. 241/101 |
| 5,255,867 A | 10/1993 | Whittleton et al. ....... 241/101.7 |
| 5,340,040 A * | 8/1994 | Bussiere et al. ...... 241/101.761 |
| 5,653,394 A | 8/1997 | Bussiere et al. ...... 241/101.742 |
| 5,950,935 A | 9/1999 | Seymour ..................... 239/670 |
| 6,027,054 A * | 2/2000 | Kaye et al. .................... 241/33 |
| 6,375,104 B1 * | 4/2002 | Hruska ..................... 241/189.1 |
| 6,572,039 B1 * | 6/2003 | Kruer et al. ................... 241/60 |
| 2002/0195509 A1* | 12/2002 | Lepage et al. ........... 241/186.3 |

FOREIGN PATENT DOCUMENTS

| | | |
|---|---|---|
| CA | 2167664 | 10/1998 |
| GB | 2100106 | 12/1982 |
| GB | 2101882 | 1/1983 |

* cited by examiner

*Primary Examiner*—Derris H. Banks
*Assistant Examiner*—Jason Y Pahng
(74) *Attorney, Agent, or Firm*—Adrian D. Battison; Michael R. Williams; Ryan W. Dupuis (57) ABSTRACT

A bale processor with a processing chamber includes a manipulator driven by a drive system that includes a hydraulic motor. The hydraulic motor of the drive system drives a drive shaft with an axis of rotation offset from a driven shaft of the manipulator. A rotation transmission mechanism allows a higher torque to be applied to the manipulator than may be applied by the hydraulic motor alone and, thereby, leads to improved performance for the bale processor. Additionally, the hydraulic motor may be sized such that the peak allowable pressure of the hydraulic motor is higher than the peak output pressure of the power source used to drive the hydraulic motor.

4 Claims, 6 Drawing Sheets

BALE MANIPULATOR DRIVE SYSTEM FOR A BALE PROCESSOR

FIELD OF THE INVENTION

The present invention relates to farm machinery for shredding bales and, more particularly, to a drive system for a bale processor bale manipulator and a bale processor using said drive system.

BACKGROUND

In the livestock industry, large round and square bales are shredded to feed and bed livestock. One type of bale processor currently in the market includes a flail drum longitudinally mounted for rotation inside a processing chamber. The flail drum is rotated and flails on the drum engage a bale inside the processing chamber, shred the baled material and discharge the shredded material out of the processor. The processors include at least one manipulator for manipulating the bale within the processing chamber to expose different portions of the bale to the flails. The manipulator may be one or more "feed rollers". The manipulator is typically driven by a hydraulic motor that allows the user to change the speed and direction of rotation of the manipulator. Typically some kind of flow restrictor is used to limit the speed of the manipulator for proper processing.

High torque may be required to drive the manipulator when large bales are processed or when baled material becomes wound around the manipulator or wedged between the manipulator and the walls of the processor. High torque is often required when frozen bales are being manipulated.

Low cost hydraulic motors typically have a peak or maximum intermittent hydraulic oil supply pressure allowance dependant on the design parameters of the motor. Torque capabilities of hydraulic motors vary directly with size (displacement) of the motor. However, as the size of the motor increases, low cost commercial motor design often does not provide for proportional increases in torque or pressure capabilities and the pressure allowance is accordingly decreased.

If a hydraulic motor is used in an application where its maximum output torque is required and the power source (typically a tractor) can provide a peak pressure higher than the pressure allowance of the motor, then a pressure relief system must be used to protect the hydraulic motor from supply pressures exceeding the pressure allowance. Pressure relief systems are inconvenient, costly and limit the torque output of the motor.

Problems have been encountered with hydraulic motor reliability or operability in some bale processors of the type described and/or a pressure relief system has been required.

SUMMARY

A bale processor with a processing chamber includes a bale manipulator driven by a hydraulic motor. The hydraulic motor drives a shaft with an axis of rotation offset from the drive shaft of the manipulator. A drive transmission is used to increase the torque supplied to the manipulator from the hydraulic motor, which is rated to operate within the pressure range of the hydraulic feed from a power source.

In accordance with an aspect of the present invention there is provided a bale processor bale manipulator drive system in a bale processor of the type having a disintegrator and a bale manipulator rotatably mounted in a processing chamber. The drive system includes a hydraulic motor mounted on the bale processor and adapted for receiving, and rated to operate within the pressure range of, the hydraulic feed from a power source and an offset drive transmission connected between the hydraulic motor and the bale manipulator, the drive transmission including torque multipliers having a ratio adapted to increase available torque to the manipulator.

In accordance with another aspect of the present invention there is provided a bale processor. The bale processor includes a processing chamber, a disintegrator rotatably mounted in the processing chamber and adapted to disintegrate baled crop material, a bale manipulator rotatably mounted in the processing chamber and adapted to manipulate the baled crop material in the processing chamber to expose different parts thereof to the disintegrator and a bale manipulator drive system. The bale manipulator drive system includes a hydraulic motor mounted on the bale processor and adapted for receiving, and rated to operate within the pressure range of, the hydraulic feed from a power source and an offset drive transmission connected between the hydraulic motor and the bale manipulator, the drive transmission including torque multipliers having a predetermined ratio so as to increase available torque to the manipulator.

In accordance with a further aspect of the present invention there is provided a bale processor bale manipulator drive system kit for use in a bale processor of the type having a disintegrator and a bale manipulator rotatably mounted in a processing chamber. The drive system kit including a mounting plate adapted for mounting on an end wall of the bale processor and for receiving a shaft connected to the bale manipulator, a hydraulic motor mounted on the mounting plate and adapted for receiving, and rated to operate within the pressure range of, the hydraulic feed from a power source and an offset drive transmission adapted for connecting between the hydraulic motor and the bale manipulator, the drive transmission including torque multipliers having a ratio adapted to increase available torque to the manipulator.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures which illustrate an embodiment exemplary of the invention.

DETAILED DESCRIPTION

Figure 1:
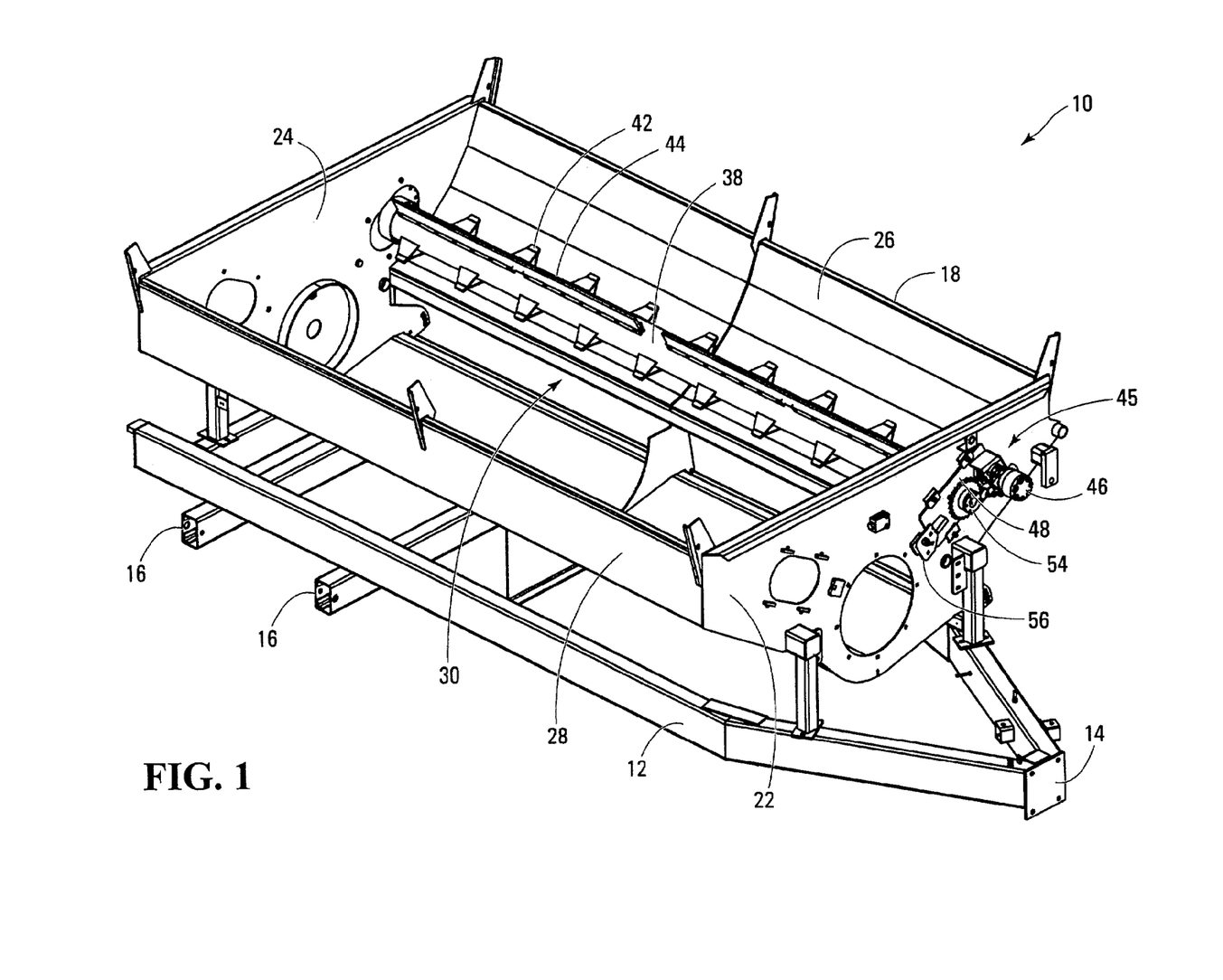
FIG. 1 is a front perspective view of a bale processor according to the invention.

FIG. 1 illustrates an exemplary bale processor 10 showing one embodiment of the present invention.

The bale processor 10 has a frame structure 12 that includes a hitch plate 14 and a pair of axle supports 16. The hitch plate 14 is adapted for installation of a hitch (not shown) for connection of the bale processor 10 to a power source, typically a tractor (not shown). The axle supports 16 allow for support of the frame structure 12 on wheels (not shown). The processor 10 includes a processing chamber 18 having a front end wall 22, a back end wall 24, a left side wall 26 and a right side wall 28. In the embodiment shown, the left side wall 26 includes a discharge opening 30 through which processed crop material is discharged.

In the illustrated embodiment, a disintegrator comprising a flail drum extending the length of the processing chamber 18 is mounted in the bottom of the processing chamber 18 of the bale processor 10. The flail drum is rotatable about its longitudinal axis such that, in operation, a series of flails pivotally mounted thereon extend to engage and separate the baled material and discharge it from the processing chamber 18.

Figure 2:
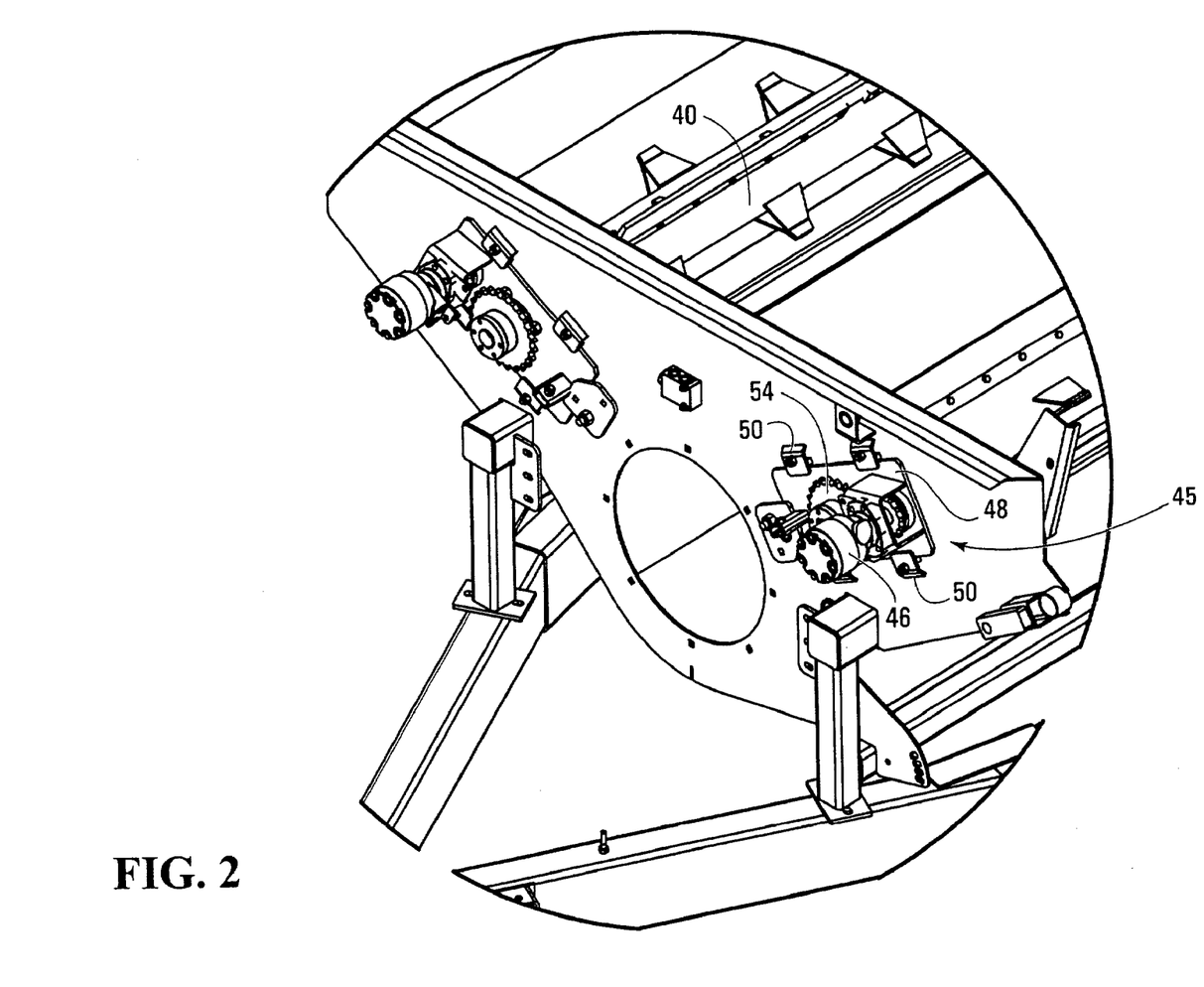
FIG. 2 is a front perspective view of a bale processor and drive system according to the invention.
Figure 4:
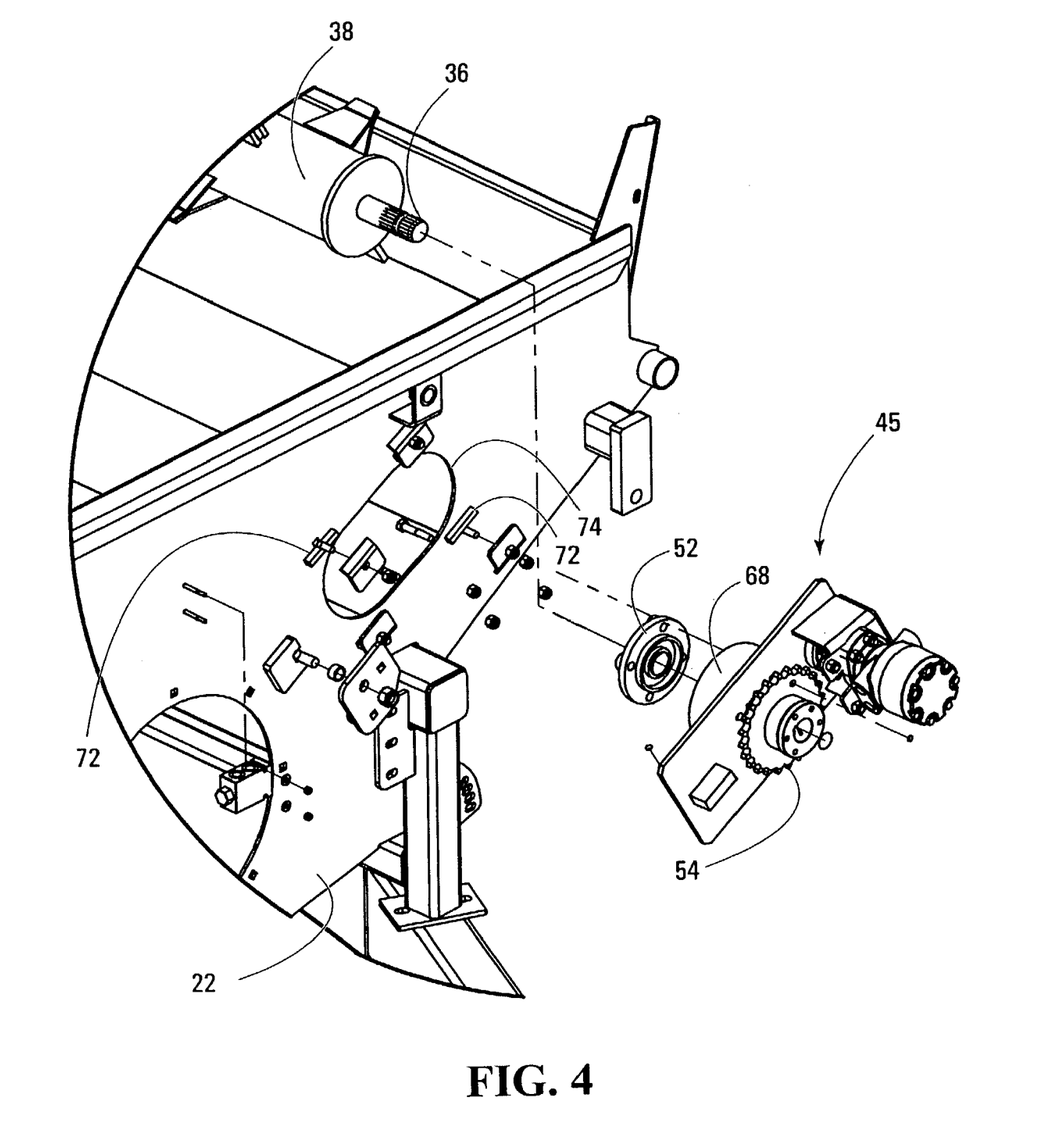
FIG. 4 is an exploded view of the front of a bale processor according to the invention.

Mounted between the front end wall 22 and the back end wall 24 of the processing chamber 18 is a manipulator, feed roller 38, having a driven shaft 36 (see FIG. 4). In operation, rotation of the driven shaft 36 results in rotation of the manipulator, and manipulation of baled material (not shown) in the processing chamber 18. During operation, a bale is supported above the disintegrator on the feed roller 38 and an opposing support means, which may be either passive or driven. In the illustrated embodiment, the manipulator of the bale processor 10 includes two driven feed rollers 38, 40 (see FIG. 2) and the bale is supported between said rollers. However, the roller 40 need not be driven, and may be a passive support roller as disclosed in applicants co-pending application PCT/CA02/00926. Generally, the manipulator functions to rotate a bale in the processing chamber 18 such that different portions of the bale are exposed to the disintegrator and the choice of the number of drives and required power will depend on the type of bale processor and the operating parameters thereof.

As discussed, the illustrated embodiment includes two feed rollers. As the feed rollers and associated drive systems are identical, for simplicity, only one feed roller and drive system is described.

In the embodiment shown, the feed roller 38 extends the length of the processing chamber 18. The feed roller 38 is rotatable about its longitudinal axis and has manipulating members comprising teeth 42 and flanges 44 extending therefrom.

Figure 5:
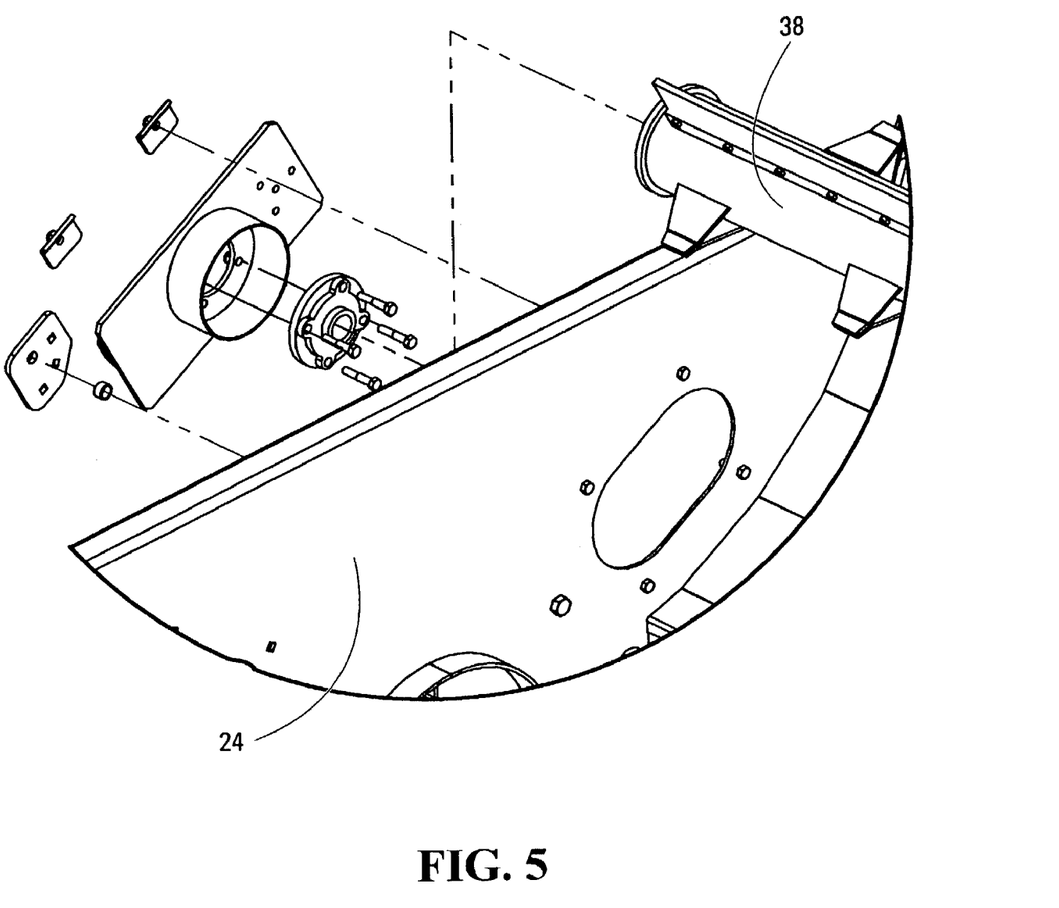
FIG. 5 is an exploded view of the rear of a bale processor according to the invention.

The feed roller 38 is mounted to the front end wall 22 by attachment to a feed roller mounting plate 48. Specifically, the driven shaft 36 extends through a set of bearings 52 that are attached to the feed roller mounting plate 48 and support the feed roller 38 while permitting rotation thereof. The bearings 52 are housed in a cylindrical flange 68 that extends into the processing chamber 18 from the feed roller mounting plate 48. The specifications for the bearings 52 are selected depending upon the typical load conditions of the feed roller 38 during operation. As shown in FIG. 5, the feed roller 38 is mounted to the back end wall 24 through a further set of bearings housed in a rear feed roller mounting plate.

The cylindrical flange 68 (see FIG. 3) extends through an aperture 74 in the front end wall 22 into the processing chamber 18. The aperture 74 may be obround and sized to allow the feed roller mounting plate 48 including cylindrical flange 68 to slide during operation. Four retainer bars 72 on the front end wall 22 of the processing chamber 18 cooperate with four retainer clips 50 to support and maintain the orientation of the feed roller mounting plate 48 on the front end wall 22. An adjustable stop plate 56 is rotatably secured to the front end wall 22 of the processing chamber 18. The adjustable stop plate 56 cooperates with a protrusion 66 outstanding from the feed roller mounting plate 48 to limit the downward travel of the feed roller mounting plate 48 and, consequently, the first feed roller 38.

A driven sprocket 54 is detachably connected to the end of the driven shaft 36 of the feed roller 38. Specifically, the driven shaft 36 of the feed roller 38 has a splined connection to the driven sprocket 54. As will be apparent to a person skilled in the art, there exist many alternatives for this connection including keyed and cross-holed connections.

Figure 3:
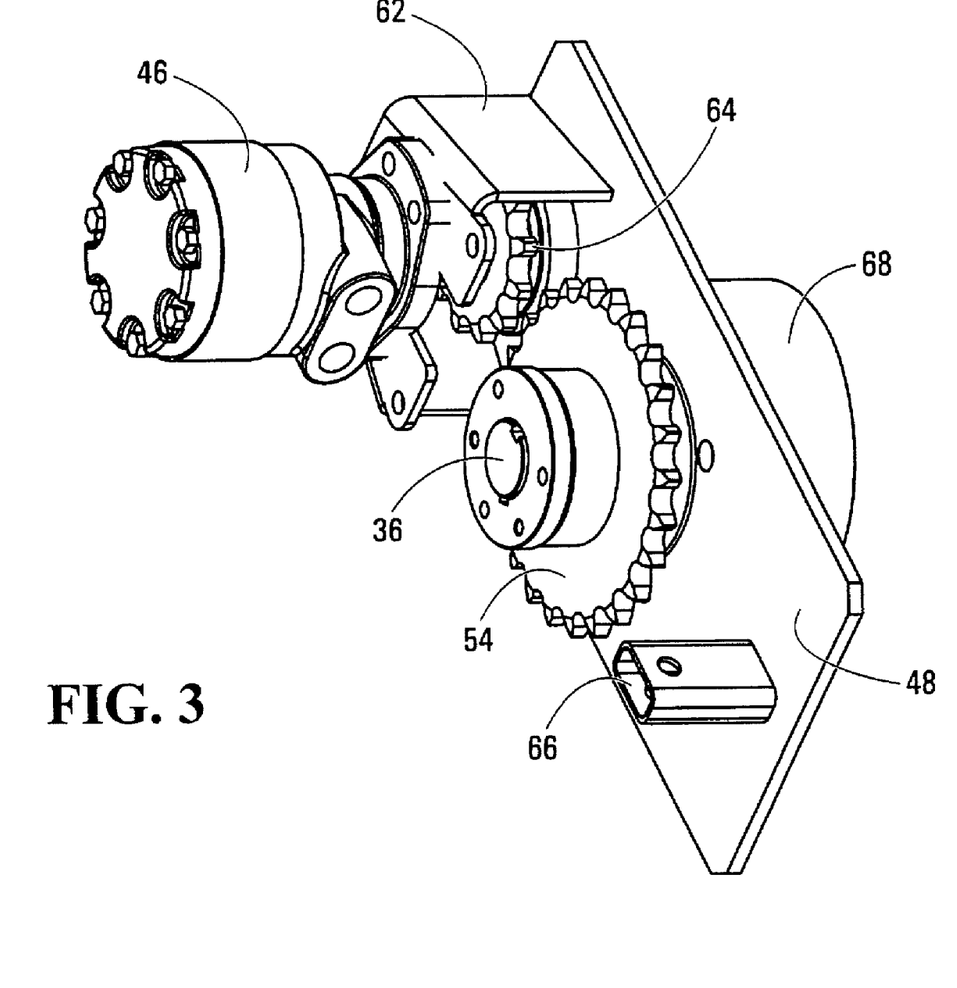
FIG. 3 is a detailed perspective view the drive system shown in FIG. 2.
Figure 6:
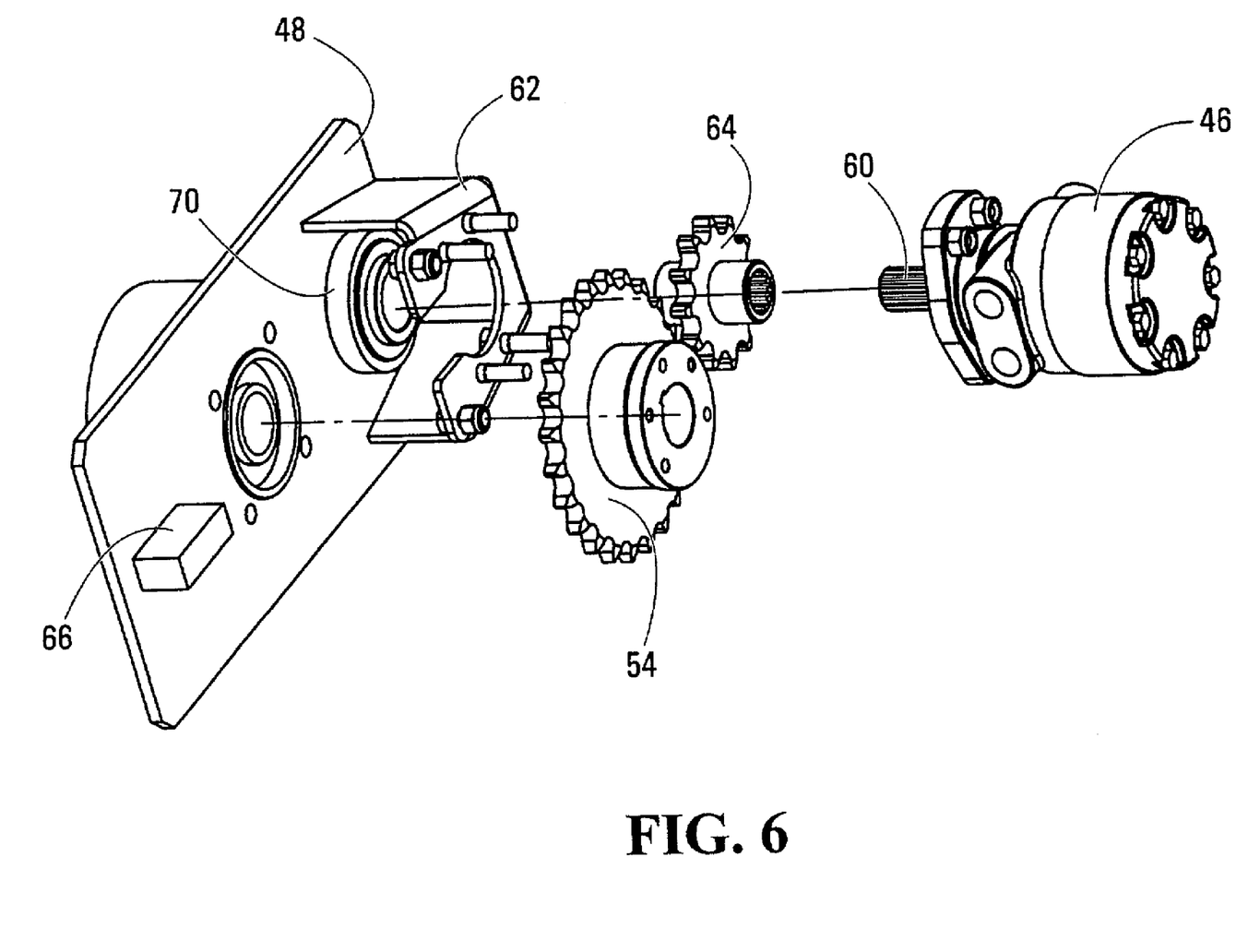
FIG. 6 is an exploded view of the drive system of FIG. 3.

A hydraulic motor 46 is mounted on the feed roller mounting plate 48 such that the axis of rotation of a motor shaft 60 (see FIG. 6) is offset from the axis of rotation of the driven shaft 36. As shown in FIG. 3, a motor mount 62 on the mounting plate 48 houses a drive sprocket 64 and supports the hydraulic motor 46. The motor mount 62 supports and retains the hydraulic motor 46 stationary during operation, maintaining the motor shaft 60 engaged with the drive sprocket 64. The feed roller mounting plate 48 includes a drive bearing set 70 to support the motor shaft 60 and to assist the internal motor bearing set (not shown) in absorbing forces on the motor shaft 60 including those forces transverse to the axis of rotation of the motor shaft 60.

The hydraulic motor 46 will typically be powered by the hydraulic feed from a tractor. Appropriate hydraulic hoses, fittings and valves (not shown) are used to connect the hydraulic motor 46 to the hydraulic feed. Where, as illustrated, two feed rollers are used to manipulate a bale in the processing chamber 18, it should be apparent to a person skilled in the art that the two hydraulic motors driving the two feed rollers may be plumbed either in series or in parallel. Rotation of the motor shaft 60 by the hydraulic motor 46 results in rotation of the drive sprocket 64. In the illustrated embodiment, a continuous chain (not shown) is used to transfer rotation of the drive sprocket 64 to the driven sprocket 54 and driven shaft 36 and, thus, to the feed roller 38. Preferably, the hydraulic motor 46 is reversible such that the feed roller 38 can rotate in a clockwise or a counter-clockwise direction.

As will be apparent to a person skilled in the art, transmission of rotational motion from the drive shaft of the hydraulic motor to the driven shaft of the feed roller is not limited to the exemplary sprocket and chain system. Many known mechanisms may be used to perform this task while acting as a torque multiplier. For instance, a pulley and belt system may use a drive pulley mounted to the drive shaft, a larger diameter driven pulley mounted to the driven shaft and a belt to transfer rotation of the drive pulley to rotation of the driven pulley. As a further alternative, a drive spur gear may be mounted to the drive shaft and a larger diameter driven spur gear mounted to the driven shaft. The driven spur gear meshes with the drive spur gear to transfer rotation of the drive spur gear to rotation of the driven spur gear.

The gear, chain or belt drive system must be sized to have the proper ratios to increase the available torque to the manipulator to a level where bale processing may be efficiently carried out without excessive stalling under the range of typical operating conditions.

In operation, as the flail drum is rotated, the flails extend radially to engage the baled crop material positioned between the feed roller 38 and the second feed roller 40, separating some of the baled crop material from the rest of the baled material and discharging the separated material through the discharge opening 30. As the feed roller 38 is rotated, the teeth 42 and the flanges 44 engage the bale in the processing chamber 18 to rotate the bale thereby exposing different sections of the bale to the flails for disintegration.

The selection of an appropriate motor and gear ratio will depend on the application of the processor including the peak hydraulic pressure supplied by the power source and the required torque for efficient processing. For instance, economic, commercially available 22.8 cu. in. motors having a sufficiently high pressure allowance (3,250 psi) to reliably operate with power supplied from the hydraulic feed from most tractors are available. However, the torque available through such a motor is around 9,200 lb.-in. which is insufficient for efficient processing of large bales, particularly if they are frozen. A presently affordable motor that is able to deliver the required torque has a 32.7 cu. in. displacement. However, the pressure allowance on commercially viable motors of that size is generally around 2,500 psi, which is lower than the peak hydraulic pressure supplied by many modern tractors (around 3,000 psi). With a 2:1 ratio between the driven sprocket radius and the drive sprocket radius, the torque available from a given hydraulic motor may be doubled through the use of the disclosed drive system. Doubling the torque available through a 22.8 cu. in. motor provides sufficient torque for efficient processing of bales with the processors of the invention. Accordingly, a 22.8 cu. in. motor, is advantageously used as part of a drive system according to the invention having a 2:1 ratio between the drive sprocket and the driven sprocket.

As will be apparent to a person skilled in the art, through the use of the drive system disclosed herein, a single hydraulic motor may be arranged to drive two feed rollers. In one example of such an arrangement, the motor shaft 60 supports two drive sprockets. Two chains may then be used to transfer rotation of each of the drive sprockets to rotation of driven sprockets attached to each of the feed rollers.

Other modifications within the ambit of the following claims will be apparent to those skilled in the art and, the invention is accordingly defined by the claims.

We claim:

1. An apparatus for processing baled crop material comprising:
   a chassis;
   ground wheels for transportation of the chassis over the ground;
   a tractor for towing the chassis;
   a bale receptacle mounted on the chassis, said receptacle having a first end wall and a second end wall, a first side wall on a first side and a second side wall on a second side connected together to form an open top into which a bale can be fed;
   the first side wall and the second side wall each being generally inclined inwardly and downwardly from the open top toward a bottom of the receptacle;
   a bottom discharge section of the receptacle being provided at the bottom of the side walls and including a discharge opening on the first side of the receptacle underneath the first side wall and opposite to said second side wall;
   a flail roller mounted in the bottom discharge section of the bale receptacle for rotation about an axis of the roller which axis extends along the receptacle from the front wall to the rear wall;
   the flail roller having a plurality of flails arranged to rotate with the roller around the axis to carry the baled material of the bale and to discharge the processed baled material out of the bale receptacle through the discharge opening;
   the flail roller being arranged to rotate in a direction so as to carry the baled material from the second side wall underneath the roller to the discharge opening underneath the first side wall;
   the flail roller and the first and second side walls being arranged such that the bale is supported, while being disintegrated, between the first and second side walls and over the flail roller;
   a driven roller mounted in the bale receptacle for driven rotation about its axis with its axis parallel to the axis of the flail roller, the driven roller being spaced inwardly of the inclined second side wall, said driven roller having an outer surface adapted to engage and provide support for a bale in the bale receptacle inwardly of the second wall and above said flail roller;
   the driven roller having bale engaging teeth extending outwardly from the outer surface thereof to engage the bale and to provide rotational force to the bale in the bale receptacle to rotate the bale and to expose different parts thereof to the flail roller when the bale is being processed;
   the driven roller having a first end mounted at the first end wall for rotation relative to the first end wall about the axis of the driven roller;
   a source of hydraulic fluid under pressure provided on the tractor;
   a hydraulic motor rotatable about an axis of the hydraulic motor for driving the driven roller;
   the hydraulic motor being arranged for connection to the source of hydraulic fluid under pressure;
   the hydraulic motor being carried on the first end wall;
   the hydraulic motor being carried on the first end wall such that the hydraulic motor projects outwardly from the first end wall and such that the axis of the hydraulic motor projects outwardly from the first end wall generally parallel to and offset to one side of the axis of the driven roller;
   a motor drive coupling member carried on the hydraulic motor and arranged to be driven thereby;
   a roller drive coupling member carried on the driven roller and connected to the first drive coupling to communicate driving torque from the hydraulic motor to the driven roller to rotate the driven roller and to rotate the bale supported on the driven roller in the receptacle;
   the source and the hydraulic motor being arranged such that the hydraulic motor has a pressure allowance greater than a maximum available pressure from the source;
   the source and the hydraulic motor being arranged such that the torque developed by the hydraulic motor in response to the maximum available pressure from the source is insufficient to ensure efficient processing of bales;
   the motor drive coupling member being smaller in diameter than the roller drive coupling member by a ratio sufficient to provide a torque multiplication of the torque developed by the hydraulic motor such that the torque applied to the driven roller is sufficient to ensure efficient processing of bales.

2. An apparatus for processing baled crop material comprising:
   a chassis;
   ground wheels for transportation of the chassis over the ground;
   a tractor for towing the chassis;
   a bale receptacle mounted on the chassis, said receptacle having a first end wall and a second end wall, a first side wall on a first side and a second side wall on a second side connected together to form an open top into which a bale can be fed;

the first side wall and the second side wall each being generally inclined inwardly and downwardly from the open top toward a bottom of the receptacle;

a bottom discharge section of the receptacle being provided at the bottom of the side walls and including a discharge opening on the first side of the receptacle underneath the first side wall and opposite to said second side wall;

a flail roller mounted in the bottom discharge section of the bale receptacle for rotation about an axis of the roller which axis extends along the receptacle from the front wall to the rear wall;

the flail roller having a plurality of flails arranged to rotate with the roller around the axis to carry the baled material of the bale and to discharge the processed baled material out of the bale receptacle through the discharge opening;

the flail roller being arranged to rotate in a direction so as to carry the baled material from the second side wall underneath the roller to the discharge opening underneath the first side wall;

the flail roller and the first and second side walls being arranged such that the bale is supported, while being disintegrated, between the first and second side walls and over the flail roller;

a first driven roller mounted in the bale receptacle for driven rotation about its axis with its axis parallel to the axis of the flail roller, the first driven roller being spaced inwardly of the inclined first side wall, said first driven roller having an outer surface adapted to engage and provide support for a bale in the bale receptacle inwardly of the first wall and above said flail roller;

the first driven roller having bale engaging teeth extending outwardly from the outer surface thereof to engage the bale and to provide rotational force to the bale in the bale receptacle to rotate the bale and to expose different parts thereof to the flail roller when the bale is being processed;

the first driven roller having a first end mounted at the first end wall for rotation relative to the first end wall about the axis of the first driven roller;

a source of hydraulic fluid under pressure provided on the tractor;

a first hydraulic motor rotatable about an axis of the first hydraulic motor for driving the first driven roller;

the first hydraulic motor being arranged for connection to the source of hydraulic fluid under pressure;

the first hydraulic motor being carried on the first end wall;

the first hydraulic motor being carried on the first end wall such that the first hydraulic motor projects outwardly from the first end wall and such that the axis of the first hydraulic motor projects outwardly from the first end wall generally parallel to and offset to one side of the axis of the first driven roller;

a first motor drive coupling member carried on the first hydraulic motor and arranged to be driven thereby;

a first roller drive coupling member carried on the first driven roller and connected to the first motor drive coupling member to communicate driving torque from the first hydraulic motor to the first driven roller to rotate the first driven roller and to rotate the bale supported on the first driven roller in the receptacle;

a second driven roller mounted in the bale receptacle for driven rotation about its axis with its axis parallel to the axis of the flail roller, the second driven roller being spaced inwardly of the inclined second side wall, said second driven roller having an outer surface adapted to engage and provide support for a bale in the bale receptacle inwardly of the second side wall and above said flail roller;

the second driven roller having bale engaging teeth extending outwardly from the outer surface thereof to engage the bale and to provide, with the first driven roller, rotational force to the bale in the bale receptacle to rotate the bale and to expose different parts thereof to the flail roller when the bale is being processed;

the second driven roller having a first end mounted at the first end wall for rotation relative to the first end wall about the axis of the second driven roller;

a second hydraulic motor rotatable about an axis of the second hydraulic motor far driving the second driven roller;

the second hydraulic motor being arranged for connection to the source of hydraulic fluid under pressure;

the second hydraulic motor being carried on the first end wall;

the second hydraulic motor being carried on the first end wall such that the second hydraulic motor projects outwardly from the first end wall and such that the axis of the second hydraulic motor projects outwardly from the first end wall generally parallel to and offset to one side of the axis of the second driven roller;

a second motor drive coupling member carried on the second hydraulic motor and arranged to be driven thereby;

a second roller drive coupling member carried on the second driven roller and connected to the second motor drive coupling member to communicate driving torque from the second hydraulic motor to the second driven roller to rotate the second driven roller and to rotate the bale supported on the second driven roller in the receptacle;

the source and the first hydraulic motor being arranged such that the first hydraulic motor has a pressure allowance greater than a maximum available pressure from the source;

the source and the second hydraulic motor being arranged such that the second hydraulic motor has a allowance greater than a maximum available pressure from the source;

the source and the first and second hydraulic motors being arranged such that the torque developed by the first and second hydraulic motors in response to the maximum available pressure from the source is insufficient to ensure efficient processing of bales;

wherein the first motor drive coupling member is smaller in diameter than the first roller drive coupling member by a ratio sufficient to provide a torque multiplication of the torque developed by the first hydraulic motor;

and the second motor drive coupling member is smaller in diameter than the second roller drive coupling member by a ratio sufficient to provide a torque multiplication of the torque developed by the second hydraulic motor;

such that the torque applied to the first and second driven rollers is sufficient to ensure efficient processing of bales.

3. An apparatus for processing baled crop material comprising:

a chassis;

ground wheels for transportation of the chassis over the ground;
a tractor for towing the chassis;
a bale receptacle mounted on the chassis, said receptacle having a first end wall and a second end wall, a first side wall on a first side and a second side wall on a second side connected together to form an open top into which a bale can be fed;
the first side wall and the second side wall each being generally inclined inwardly and downwardly from the open top toward a bottom of the receptacle;
a bottom discharge section of the receptacle being provided at the bottom of the side walls and including a discharge opening on the first side of the receptacle underneath the first side wall and opposite to said second side wall;
a flail roller mounted in the bottom discharge section of the bale receptacle for rotation about an axis of the roller which axis extends along the receptacle from the front wall to the rear wall;
the flail roller having a plurality of flails arranged to rotate with the roller around the axis to carry the baled material of the bale and to discharge the processed baled material out of the bale receptacle through the discharge opening;
the flail roller being arranged to rotate in a direction so as to carry the baled material from the second side wall underneath the roller to the discharge opening underneath the first side wall;
the flail roller and the first and second side walls being arranged such that the bale is supported, while being disintegrated, between the first and second side walls and over the flail roller;
a driven roller mounted in the bale receptacle for driven rotation about its axis with its axis parallel to the axis of the flail roller, the driven roller being spaced inwardly of the inclined second side wall, said driven roller having an outer surface adapted to engage and provide support for a bale in the bale receptacle inwardly of the second wall and above said flail roller;
the driven roller having bale engaging teeth extending outwardly from the outer surface thereof to engage the bale and to provide rotational force to the bale in the bale receptacle to rotate the bale and to expose different parts thereof to the flail roller when the bale is being processed;
the driven roller having a first end mounted at the first end wall for rotation relative to the first end wall about the axis of the driven roller;
a source of hydraulic fluid under pressure provided on the tractor;
a hydraulic motor rotatable about an axis of the hydraulic motor for driving the driven roller;
the hydraulic motor being arranged for connection to the source of hydraulic fluid under pressure;
the hydraulic motor being carried on the first end wall;
the hydraulic motor being carried on the first end wall such that the hydraulic motor projects outwardly from the first end wall and such that the axis of the hydraulic motor projects outwardly from the first end wall generally parallel to and offset to one side of the axis of the driven roller;
a mounting plate carried on the first end wall and movable relative thereto in a direction parallel to the first end wall;
a motor drive coupling member carried on the hydraulic motor and arranged to be driven thereby;
a roller drive coupling member carried on the driven roller and connected to the motor drive coupling member to communicate driving torque from the hydraulic motor to the driven roller to rotate the driven roller and to rotate the bale supported on the driven roller in the receptacle;
the hydraulic motor, the driven roller, the motor drive coupling member and the roller drive coupling member being carried on the mounting plate for movement therewith relative to the first end wall;
the source and the hydraulic motor being arranged such that the hydraulic motor has a pressure allowance greater than a maximum available pressure from the source;
the source and the hydraulic motor being arranged such that the torque developed by the hydraulic motor in response to the maximum available pressure from the source is insufficient to ensure efficient processing of bales;
the motor drive coupling member being smaller in diameter than the roller drive coupling member by a ratio sufficient to provide a torque multiplication of the torque developed by the hydraulic motor such that the torque applied to the driven roller is sufficient to ensure efficient processing of bales.

4. An apparatus for processing baled crop material comprising:
a chassis;
ground wheels for transportation of the chassis over the ground;
a tractor for towing the chassis;
a bale receptacle mounted on the chassis, said receptacle having a first end wall and a second end wall, a first side wall on a first side and a second side wall on a second side connected together to form an open top into which a bale can be fed;
the first side wall and the second side wall each being generally inclined inwardly and downwardly from the open top toward a bottom of the receptacle;
a bottom discharge section of the receptacle being provided at the bottom of the aide walls and including a discharge opening on the first side of the receptacle underneath the first side wall and opposite to said second side wall;
a flail roller mounted in the bottom discharge section of the bale receptacle for rotation about an axis of the roller which axis extends along the receptacle from the front wall to the rear wall;
the flail roller having a plurality of flails arranged to rotate with the roller around the axis to carry the baled material of the bale and to discharge the processed baled material out of the bale receptacle through the discharge opening;
the flail roller being arranged to rotate in a direction so as to carry the baled material from the second side wall underneath the roller to the discharge opening underneath the first side wall;
the flail roller and the first and second side walls being arranged such that the bale is supported, while being disintegrated, between the first and second side walls and over the flail roller;
a first driven roller mounted in the bale receptacle for driven rotation about its axis with its axis parallel to the axis of the flail roller, the driven roller being spaced inwardly of the inclined first side wall, said driven roller having an outer surface adapted to engage and provide support for a bale in the bale receptacle inwardly of the first side wall and above said flail roller;

the first driven roller having bale engaging teeth extending outwardly from the outer surface thereof to engage the bale and to provide rotational force to the bale in the bale receptacle to rotate the bale and to expose different parts thereof to the flail roller when the bale is being processed;

the first driven roller having a first end mounted at the first end wall for rotation relative to the first end wall about the axis of the driven roller;

a source of hydraulic fluid under pressure provided on the tractor;

a first hydraulic motor rotatable about an axis of the hydraulic motor for driving the first driven roller;

the first hydraulic motor being arranged for connection to the source of hydraulic fluid under pressure;

the first hydraulic motor being carried on the first end wall;

the first hydraulic motor being carried on the first end wall such that the hydraulic motor projects outwardly from the first end wall and such that the axis of the hydraulic motor projects outwardly from the first end wall generally parallel to and offset to one side of the axis of the first driven roller;

a first mounting plate carried on the first end wall and movable relative thereto in a direction parallel to the first end wall;

a first motor drive coupling member carried on the hydraulic motor and arranged to be driven thereby;

a first roller drive coupling member carried on the driven roller and connected to the motor drive coupling member to communicate driving torque from the hydraulic motor to the driven roller to rotate the driven roller and to rotate the bale supported on the driven roller in the receptacle;

the first hydraulic motor, the first driven roller, the first motor drive coupling member and the first roller drive coupling member being cried on the first mounting plate for movement therewith relative to the first end wall;

a second driven roller mounted in the bale receptacle for driven rotation about its axis with its axis parallel to the axis of the flail roller, the second driven roller being spaced inwardly of the inclined second side wall, said driven roller having an outer surface adapted to engage and provide support for a bale in the bale receptacle inwardly of the second side wall and above said flail roller;

the second driven roller having bale engaging teeth extending outwardly from the outer surface thereof to engage the bale and to provide, with the first driven roller, rotational force to the bale in the bale receptacle to rotate the bale and to expose different parts thereof to the flail roller when the bale is being processed;

the second driven roller having a first end mounted at the first end wall for rotation relative to the first end wall about the axis of the second driven roller;

a second hydraulic motor rotatable about an axis of the second hydraulic motor for driving the second driven roller;

the second hydraulic motor being arranged for connection to the source of hydraulic fluid under pressure;

the second hydraulic motor being carried on the first end wall;

the second hydraulic motor being carried on the first end wall such that the second hydraulic motor projects outwardly from the first end wall and such that the axis of the second hydraulic motor projects outwardly from the first end wall generally parallel to and offset to one side of the axis of the second driven roller;

a second mounting plate carried on the first end wall and movable relative thereto in a direction parallel to the first end wall;

a second motor drive coupling member carried on the second hydraulic motor and arranged to be driven thereby;

a second roller drive coupling member carried on the second driven roller and connected to the second motor drive coupling member to communicate driving torque from the second hydraulic motor to the second driven roller to rotate the second driven roller and to rotate the bale supported on the second driven roller in the receptacle;

the second hydraulic motor, the second driven roller, the second motor drive coupling member and the second roller drive coupling member being carried on the second mounting plate for movement therewith relative to the first end wall;

the source and the first hydraulic motor being arranged such that the first hydraulic motor has a pressure allowance greater than a maximum available pressure from the source;

the source and the second hydraulic motor being arranged such that the second hydraulic motor has a pressure allowance greater than the maximum available pressure from the source;

the source and the first and second hydraulic motors being arranged such that the torque developed by the first and second hydraulic motors in response to the maximum available pressure from the source is insufficient to ensure efficient processing of bales;

wherein the first motor drive coupling member is smaller in diameter than the first roller drive coupling member by a ratio sufficient to provide a torque multiplication of the torque developed by the first hydraulic motor;

and the second motor drive coupling member is smaller in diameter than the second roller drive coupling member by a ratio sufficient to provide a torque multiplication of the torque developed by the second hydraulic motor;

such that the torque applied to the first and second driven rollers is sufficient to ensure efficient processing of bales.

* * * * *